March 1, 1960 R. J. TURNER 2,927,222
POLARIZING SEMICONDUCTIVE APPARATUS
Filed May 27, 1955 2 Sheets-Sheet 1

INVENTOR.
ROLAND J. TURNER
BY
Cesar V. Hazeltine
ATTORNEY

POLARIZING SEMICONDUCTIVE APPARATUS

Filed May 27, 1955 2 Sheets-Sheet 2

INVENTOR.
ROLAND J. TURNER
BY
Allen V. Hazeltine
ATTORNEY 2,927,222

POLARIZING SEMICONDUCTIVE APPARATUS

Roland J. Turner, Philadelphia, Pa., assignor to Philco Corporation, Philadelphia, Pa., a corporation of Pennsylvania Application May 27, 1955, Serial No. 511,533

3 Claims. (Cl. 307—88.5)

The present invention relates to semiconductive signal-translating means, and particularly to amplifying apparatus of the transistor type.

Semiconductive devices are known in the prior art which utilize a base of semiconductive material, and an emitter and a collector of minority-carriers, to provide amplification of signals applied thereto. In the operation of such devices, input signals are customarily applied between base and emitter elements to vary the number of minority-carriers injected into the base, and the injected carriers then diffuse away from the emitter and are extracted by the nearby collector element. By carefully locating the emitter and collector elements in closely confronting relationship, it has been found possible to operate such devices at moderately high frequencies. However, since the flow of minority-carriers from emitter to collector is primarily by diffusion, the transit time of the carriers, as well as the transit time dispersion thereof, is relatively great even for small spacings, and has imposed a basic limitation upon the highest frequency at which such devices have been operated with amplification.

It is therefore an object of my invention to provide new and improved semiconductive signal-translating apparatus.

Another object is to provide such apparatus characterized particularly by the ability to provide amplification at extremely high frequencies.

A further object is to provide a transistor oscillator operable at unusually high frequencies.

Still another object is to provide a new and improved method of operating a semiconductive signal-translating device.

In accordance with the invention, there is employed a transistor which is so constructed, and which is supplied with such potentials, that the depletion zones adjacent emitter and collector touch and merge over at least a portion of their confronting regions. When the boundaries of the two depletion zones are thus merged to provide a communicating aperture between them, a condition exists which will be referred to hereinafter as "punch-through." With the transistor in the punch-through condition, the electric field due to the potential applied to the collector reaches through to the emitter, and is of the polarity to increase and accelerate the flow of minority-carriers to the collector. The transit time and transit-time dispersion of the minority-carriers under these conditions is much shorter than when diffusion flow is relied upon, and the percentage of minority-carriers reaching the collector may also be much greater in these circumstances.

I have found that, with the transistor in the punch-through condition, useful control of the emitter-to-collector current may be obtained by varying the potential between emitter and base electrodes. For stability and efficiency of operation, the depletion zones associated with emitter and collector are highly curved below the punch-through voltage, while for strong control of the emitter-to-collector current, corresponding to large transconductance, the depletion zones preferably diverge only slowly immediately outside the region of punch-through. One suitable type of transistor for this purpose is shown and described in the copending application Serial No. 508,262 of Richard A. Williams, filed May 13, 1955, and entitled "Electrical Apparatus." With such geometry, the punched-through depletion zones are characterized by a restricted region where the two zones merge, and variations in base potential, with respect to emitter potential, produce changes in the shape of the punched-through depletion zones so as to vary the area of the restricted region thereof in which merging occurs; when this area is made smaller, the emitter-to-collector current is reduced, and when it is made larger the current increases.

With proper adjustment in accordance with the general principles set forth hereinafter, the changes in collector current produced by the changes in base-to-emitter voltage may be large, resulting in values of transconductance of from 5,000 to 40,000 micromhos, for example, and providing substantial circuit gains in many applications. Since the transit-time and transit-time dispersion of the minority-carriers are very low, due to strong acceleration of carriers by the electric field in the depletion zones in the punch-through condition, frequencies of operation extending upwards into the hundreds of megacycles/second are readily obtained. Since nearly all of the minority-carriers are attracted to and captured by the collector, very few reach the base, and the device therefore exhibits extremely high input impedance at its base. For this reason the device is essentially voltage operated, and is therefore particularly adapted for use in many circuits in which vacuum tubes might otherwise be required.

The specific values of bias potentials to be applied to the elements of the transistor in any particular case depend upon the physical properties and geometry of the particular transistor used. In general, the magnitude of the collector potential required to produce punch-through decreases with decreases in the width of the base region and its resistivity, and, for close spacings of emitter and collector and for low resistivity base materials, may be produced at conveniently low voltages, as will be exemplified hereinafter.

Other objects and features of the invention will be readily comprehended from a consideration of the following detailed description, taken in connection with the accompanying drawings, in which.

Figure 1A:
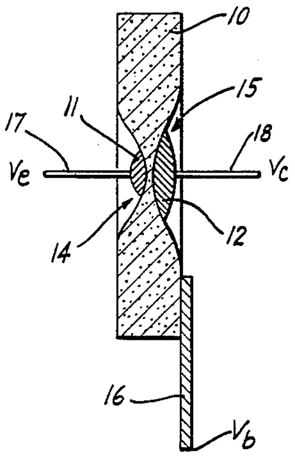
Figures 1A and 1B are sectional and plan views, respectively, of a transistor suitable for use in the apparatus of the invention, shown on an enlarged scale.
Figure 1B:
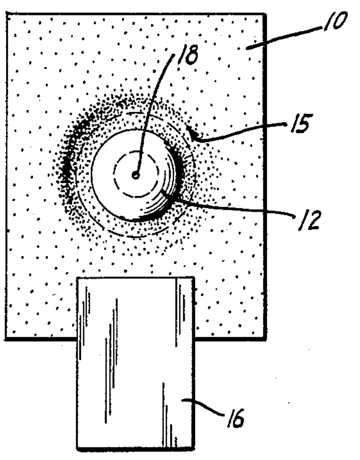

Referring now to Figures 1A and 1B, wherein like numerals denote like parts, the transistor there shown is of the surface-barrier type having highly curved electrodes, as described and claimed in the copending application Serial No. 508,262 of R. A. Williams, filed May 13, 1955, and entitled "Electrical Apparatus." The general principles of operation and construction of surface-barrier transistors need not be described here in detail, since they are set forth fully in the copending applications Serial No. 472,824 of J. W. Tiley and R. A. Williams filed December 3, 1954, and entitled "Semiconductive Devices and Methods for the Fabrication Thereof," and Serial No. 472,826 of R. A. Williams and J. W. Tiley, also filed December 3, 1954, and entitled "Electrical Device."

The transistor of Figures 1A and 1B comprises a body of a semiconductive material 10, suitable as a transistor base into which minority-carriers may be injected from an emitter electrode 11 and from which they may be extracted by a collector electrode 12. Each of these electrodes is in intimate, substantially stressless area-contact with body 10, so that each provides a corresponding potential-barrier at the metal-to-semiconductor interface. Emitter and collector electrodes 11 and 12 are in this case situated upon the directly opposing surfaces of body 10, within a pair of curved depressions 14 and 15, respectively, so as to be separated by only a small distance in their region of closest approach. A metallic base tab 16, which may be soldered to base 10, provides substantially ohmic contact to the base, and filamentary emitter and collector contacting leads 17 and 18 are applied to the emitter and collector electrodes, respectively, by spring contact or soldering for example, to facilitate connection to external elements.

Semiconductive body 10 may typically be of germanium or silicon, although other elemental or compound materials may also be used, and emitter and collector electrodes 11 and 12 are preferably constituted and applied in accordance with the teachings of the above-mentioned copending applications so as to provide area contacts of the rectifying type, and, at least in the case of the emitter electrode, a contact which is capable of injecting minority-carriers into base 10. One suitable metal for use on N-type germanium is indium, for example. Extending inward from the surface of the semiconductor beneath each metal contact there is thereby provided a potential barrier, and a zone adjacent thereto which is at least partially depleted of current-carriers, and hence permeated by a strong electric field due to the biasing voltage. The physical basis for such depletion zones, as well as the factors affecting their width, being well known, it will not be necessary to discuss their details here except to point out that, as the barrier is biased more strongly in the reverse direction, the depletion zone spreads further into the semiconductive body.

The emitter and collector elements, as shown, are highly curved in the vicinity of the region of their closest approach, in a direction such that the spacing between them increases relatively rapidly as a function of position on either side of the minimum in spacing. As a result, the depletion zones adjacent the electrodes are also of highly divergent geometry, having at least as great curvature as the electrodes associated therewith.

I have found that, utilizing the highly curved geometry of depletion zones obtained with the emitter and collector configurations shown in Figure 1A, the collector voltage $V_c$ may be increased beyond that normally utilized so that the depletion zone immediately adjacent the collector extends through the intervening base region to the emitter depletion zone, producing a condition commonly referred to as "punch-through," and that in this condition control of the magnitude of the emitter-to-collector current by the base potential may still be effected so that signal gain is obtained. Since the current-carriers passing from emitter to collector then move through the entire width of the base under the influence of relatively strong electric fields, rather than by diffusion, extremely short transit times and only small amounts of transit-time dispersion are obtained, with resultant improvements in high-frequency performance. In general, the higher the collector voltage the more rapid the flow of carriers and hence the higher the maximum frequency of operation; however the percentage of the emitter-to-collector current which is controlled by the base potential also tends to decrease as the collector voltage is increased far above the minimum punch-through voltage, so that ordinarily it will be desirable for most efficient operation to adjust the collector voltage only slightly above this minimum value.

Figures 2, 3:
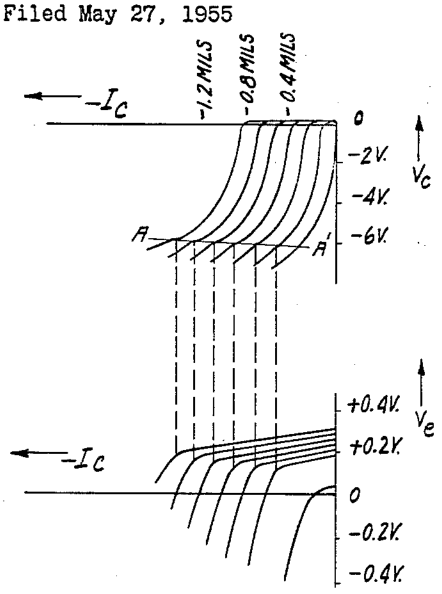
Figures 2, 3 and 4 are graphical representations, to which reference will be made in explaining the mode of operation of the apparatus of the invention.

Figures 2 and 3 illustrate the manner in which the collector voltage and the emitter voltage, respectively, change upon the onset of the high-frequency mode occurring at punch-through, for one particular transistor having a base of 0.1 ohm-centimeter N-type germanium, electroplated surface-barrier emitter and collector elements of indium of about 0.2 and 0.4 mil diameter, respectively, geometry similar to that shown in Figures 1A and 1B, and a minimum spacing of approximately 0.05 mil. Figure 2 is a plot in which ordinates represent collector voltage and abscissae represent collector current in such a transistor, for seven different fixed values of emitter current. The curve nearest the ordinate axis is a plot of $V_c$ versus $I_c$ for zero emitter current, and curves progressively farther to the left in the figure are similar plots for emitter currents of 200, 400, 600, 800, 1,000 and 1,200 microamperes, respectively. For collector voltages of less than about 6 volts negative, i.e. for portions of the curves lying above the line AA′, the shapes of the curves follow substantially the normal form for the collector characteristics of a transistor operated in the normal mode, each curve having a small region near zero collector voltage for which the collector current increases relatively rapidly with increases in negative collector voltage, followed by a region of substantial saturation in which the collector current increases only slightly with further increases in negative collector voltage. However, when the collector voltage increases even further in the negative direction, below the line AA′, the collector current first rises abruptly for a small increment in collector voltage, but thereafter returns to a slower rate of increase which persists until diode breakdown occurs. At the same time, at which the abrupt increase in collector current occurs, the variation of emitter voltage with collector current exhibits a corresponding sudden change as is shown by Figure 3.

In the latter figure, the curves indicate by their ordinates the values of emitter voltage $V_e$ produced during the tracing of the corresponding curves of Figure 2, the curve nearest the axis of ordinates corresponding to that nearest the ordinate axis in Figure 2, and successive curves corresponding to the correspondingly-positioned curves of Figure 2. It is noted that when the collector voltage, as shown by Figure 2, approaches 6 volts negative, the emitter voltage suddenly begins to fall relatively rapidly in the negative direction, as indicated by the sharp downward bend at the knee of each of the curves of Figure 3. It is apparently at this point that the depletion zones of collector and emitter begin to interact strongly and to merge, producing an electric field region extending all the way from emitter to collector and resulting in the abrupt increase in collector current shown in Figure 2 and the sudden decrease in emitter voltage shown in Figure 3.

Figure 4:
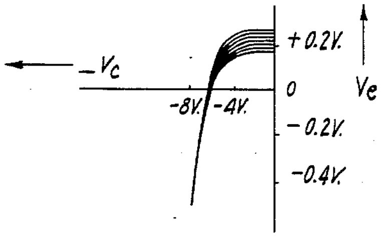

Although the collector current may increase relatively rapidly above the minimum punch-through voltage, so long as the collector voltage falls less rapidly than the emitter voltage in the punch-through condition, amplification may be obtained. Thus, as is shown in Figure 4, I have found that the $\mu$ of the device, i.e. the ratio of collector voltage to emitter voltage for constant emitter current, may remain greater than unity over a substantial range of operating voltages, thereby making signal-amplification possible. In Figure 4, ordinates indicate emitter voltage and abscissae indicate collector voltage for the operating conditions represented by the curves of Figures 2 and 3, and the slopes of the curves of Figure 4 therefore indicate the $\mu$ of the device for the corresponding operating conditions. For collector voltages of less than about −6 volts, the emitter voltage as shown is positive and substantially constant, corresponding to a large value of slope and hence of $\mu$. However, at a collector voltage of slightly less than −6 volts, the emitter voltage begins to fall rapidly, becoming increasingly negative by substantial amounts for small increases in negative collector voltage. While the slope $$\frac{dV_c}{dV_e}$$

of the curves of Figure 4 suddenly becomes substantially smaller at about −6 volts collector voltage, corresponding to a lowered value of $\mu$, nevertheless the $\mu$ remains greater than unity throughout this range, being substantially equal to 4 in this example.

Although I do not wish to be bound by the details of any particular theory as to the physical basis of operation of the invention, the mode of operation is believed to depend upon the following factors. Referring to Figure 5, wherein 11 and 12 again represent emitter and collector surface-barrier electrodes separated by intervening base material, the dotted lines 30 and 31 represent the general form of the limits of the depletion zones adjacent emitter and collector when the transistor is operated in the normal mode in which the depletion zones are spaced from each other. Because of the high degree of curvature of the electrodes, the depletion zones are also highly curved. When the collector-to-base voltage is increased to a value slightly above the minimum value producing punch-through, the collector depletion zone expands so as to extend to, and partially merge with, the emitter depletion zone by way of a communicating aperture of diameter *m*, as shown by dashed lines 32 and 33. Relatively heavy currents then flow from emitter to collector because of the strong fields in the depletion zones, and the emitter and collector potentials tend to approach each other. When the collector-to-base voltage is increased still further, the depletion zones may assume the general configuration shown by the solid lines 34 and 35, in which condition an aperture of larger diameter *p*, and substantially higher currents, are produced.

Figure 5:
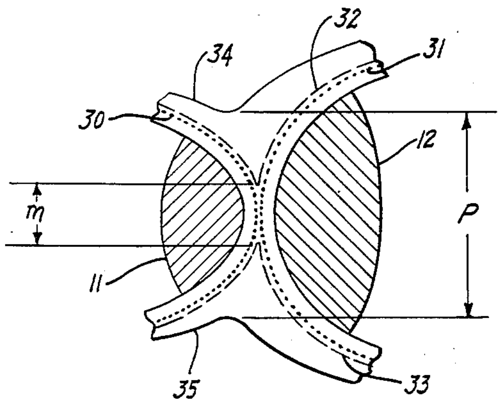
Figure 5 is an explanatory diagram, to which reference will be made in explaining a theory of the operation of the device of the invention.

Furthermore, with the collector supply voltage fixed to provide a merged depletion zone generally similar to that shown by the dashed line in Figure 5, varying the potential between emitter contact 11 and the base contact also changes the aperture diameter and the emitter-to-collector current. Thus when the base is of N-type material, the base contact may be varied through a range of positive values, the more positive values causing the aperture and the collector current to become smaller. Although all of the factors contributing to this control of collector current by the base potential are not fully understood, it appears that, with the geometry shown, there is a potential rise within the merged depletion zone near the emitter contact which tends to retard the flow of holes from emitter to collector to some extent, and which is varied in height by the change in shape of the depletion zone caused by the base potential variations. In any event, when the collector potential is sufficiently negative to produce punch-through, but not sufficiently high to cause the emitter and collector depletion zones to merge over their entire confronting areas, there exists a condition in which the base potential can control the collector current, with gain. Since the depletion zones are highly curved, there is a substantial range of thickness of depletion zone, and hence of collector voltage, for which the punch-through condition exists and the aperture diameter is not so great as to produce complete breakdown with prohibitively large currents.

While the fundamental principle of operation is believed to be as described above, it will be understood that other factors may also play a part in producing gain in some instances. For example, for high signal frequencies there may be a substantial amount of capacitive coupling of the base signal variation to the central portions of the emitter-to-collector current stream, producing additional control. Furthermore, while the device as described hereinbefore may under some conditions exhibit a negative-resistance characteristic by virtue of aperture-controlled operation, it is also possible to augment such characteristics and to obtain increased values of alpha by utilizing at least some degree of electron-avalanching in the base material. Such operation may be produced by utilizing a collector such that, at the operating voltages used in the punch-through mode, substantial avalanching occurs, as described in the above-cited copending application Serial No. 508,262.

Figure 6:
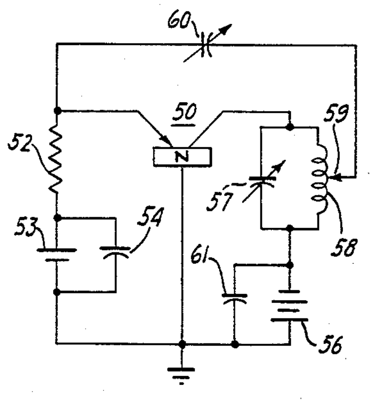
Figure 6 is a schematic diagram showing a circuit arrangement embodying the invention in one form thereof.

Figure 6 shows one typical circuit in which my novel form of operation is produced. Although as shown the circuit operates as an oscillator, it will be understood that the principles thereof are equally applicable to amplifiers in which feedback sufficient to produce oscillations is not employed. The transistor 50 is constructed as described generally hereinbefore with reference to Figures 1A and 1B, and is operated in this case with its base grounded directly and its emitter connected to ground by way of emitter resistor 52 and biasing battery 53, the latter element being bypassed by capacitor 54 and, as shown, arranged in the polarity to bias the emitter in the forward direction. The collector is connected to a source 56 of negative bias potential by way of a tuned circuit comprising a variable capacitor 57 in parallel with a variably-tapped inductor 58, and positive feedback from the variable tap 59 to the emitter is provided by variable capacitor 60.

The frequency of oscillation of the circuit of Figure 6 may be controlled by variation of capacitor 57, and capacitor 60 and the position of tap 59 may be adjusted to obtain an optimum combination of feedback and impedance matching between collector and emitter for best loop gain. Under these conditions, the maximum frequency of oscillation is unusually high when the collector voltage is sufficiently negative to produce punch-through.

Figure 7:
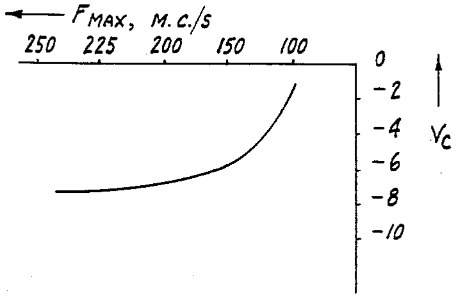
Figure 7 is a graphical representation illustrating certain performance characteristics of apparatus in accordance with the invention.

Figure 7 indicates the manner in which the maximum oscillating frequency increases above the punch-through with increases in collector voltage, for a transistor of the type exemplified hereinabove connected in the circuit of Figure 6. As shown by Figure 7, in which ordinates represent collector voltage and abscissae represent maximum oscillator frequency $F_{max}$, it will be appreciated that for 4 volts or less of negative collector voltage the maximum oscillator frequency is of the order of 100 megacycles per second, and increases relatively slowly with increases in collector voltage. However, in the vicinity of −6 volts the maximum oscillating frequency begins to increase rapidly, being greater than about 235 megacycles per second for a collector voltage of about 9 volts negative. The particular value of maximum oscillating frequency obtained in any particular case depends in part upon the physical and geometric characteristics of the transistor, and, as the frequencies become extremely high, upon the electrical characteristics of the holder in which it is contained; it will therefore be understood that frequencies substantially higher than those shown by Figure 7 may be obtained in many cases, the values indicated having been obtained in one particular case with a transistor and circuit having the following specific values of the several parameters:

| | |
|---|---|
| Diameter of emitter | 2 mils. |
| Diameter of collector | 4 mils. |
| Minimum spacing between emitter and collector | 0.05 mil. |
| Semiconductive material | N-type Ge, 0.1 ohm-centimeter resistivity. |
| Emitter resistor 52 | 10,000 ohms. |
| Emitter bias source 53 | 10 volts. |
| Bypass capacitor 54 | 1,000 micromicrofarads. |
| Capacitor 57 | 1.5–7 micromicrofarads. |

| | |
|---|---|
| Inductor 58 | 0.1 microhenry. |
| Capacitor 60 | 4–30 micromicrofarads. |
| Capacitor 61 | 1,000 micromicrofarads. |
| Collector voltage | 5.5 volts negative. |

Figure 8:
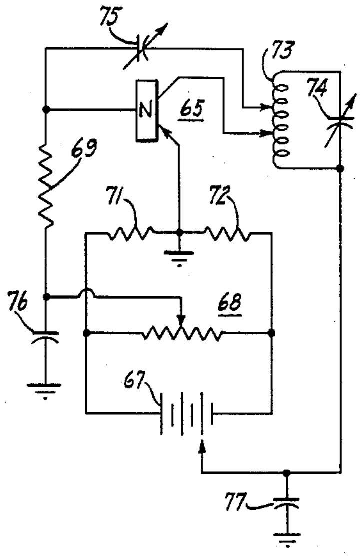
Figure 8 is a schematic diagram of another circuit arrangement embodying the invention.

Figure 8 illustrates another embodiment of the invention, particularly characterized in that the emitter-to-base diode may be biased in the reverse direction until the onset of punch-through, with resultant savings in current in some applications. The circuit is arranged in the grounded-emitter configuration, and is connected as an oscillator, although it may also be utilized as an ordinary amplifier by removing the positive feedback connection. Thus, in the example, the transistor 65, preferably of the type exemplified hereinbefore, has its emitter grounded directly, while its base is supplied with a positive potential from source 67 by way of voltage divider 68 and base resistor 69. A pair of balancing resistors 71 and 72 of equal value are also connected across source 67, with their common connection grounded, so that the voltage at the tap of divider 68 may be made either positive or negative with respect to ground.

Potential for the collector is supplied from a tap on source 67 by way of a tuned tank circuit comprising inductor 73 in parallel with variable capacitor 74. Feedback from collector-to-base is provided by variable capacitor 75, and the emitter and collector supply source are bypassed to ground by capacitors 76 and 77, respectively. Separately variable taps on inductor 73 permit optimum impedance matching of collector and base for best loop gain.

In a representative embodiment, the various elements of Figure 8 may have the following values:

| | |
|---|---|
| Voltage of source 67 | 30 volts. |
| Total resistance of divider 68 | 10,000 ohms. |
| Resistors 69, 71 and 72 | 10,000 ohms each. |
| Inductor 73 | 0.1 microhenry. |
| Capacitor 74 | 1.5–7 micromicrofarads. |
| Capacitor 75 | 4–30 micromicrofarads. |
| Capacitors 76 and 77 | 1,000 micromicrofarads each. |

With this circuit, oscillation frequencies similar to those obtained with the circuit of Figure 7 may be obtained, with corresponding collector voltages but with a quiescent base supply voltage which is positive with respect to emitter, for example by 5 volts.

Figure 9:
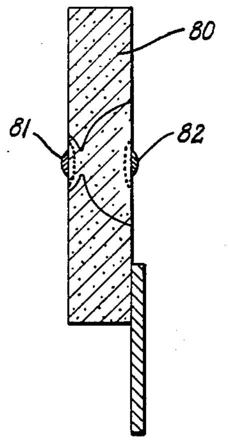
Figure 9 is a sectional view of another form of transistor suitable for use in the apparatus of the invention.

Although I prefer to utilize the geometry of transistor shown in Figures 1A and 1B in order to obtain the curved depletion zones shown in Figure 5, it is also possible to obtain operation in accordance with the mode described hereinbefore by utilizing electrodes sufficiently small compared to the spacing between them. This is illustrated in Figure 9, wherein base body 80 is of substantial width, i.e. of the order of 3 mils, emitter and collector electrodes 81 and 82 are substantially smaller than the width of the intervening base material, i.e. of the order of ½ mil in diameter, and the voltages applied to emitter and collector are sufficient to cause the depletion zones adjacent thereto to expand from the normal position shown by the dotted lines to the merged position shown by the solid lines, substantially as shown. However, with this arrangement it will be appreciated that extremely small emitter and collector electrodes must be utilized, or relatively large biasing potentials, so as to achieve the desired curvature of the depletion zones, and for this reason it is preferred to utilize the curved-electrode transistor of Figures 1A and 1B.

While each of the transistors shown and described in detail utilizes a surface-barrier emitter and collector, it is possible to obtain similar results by utilizing as the electrodes a metal suitable for converting the base material to the opposite conductivity material when alloyed therewith, and by then heating and cooling the assembly slightly to produce a pair of opposed P-N junctions. Although the precise control of the geometry possible with the surface-barrier electrode system is then not fully realized, nevertheless satisfactory results may be obtained in many cases. Furthermore, although the specific examples given have been for the case of an N-type body of base material, similar results may be obtained when the transistor is of a type having a P-type base, when the bias voltages are appropriately reversed in a manner apparent to those skilled in the art.

Although the invention has been described with particular reference to specific embodiments, it will be appreciated that it may also be practiced in any of a large variety of forms without departing from the scope of the invention.

I claim:

1. The method of operating a transistor to provide improved high frequency operation, said transistor having an emitter element, a collector element and an intervening base element, said base element having a resistivity less than about 1 ohm centimeter and a minimum thickness between said emitter and collector elements of less than about 0.1 mil, said method comprising operating said transistor with a reverse collector voltage which is greater than the punch through voltage $V_{PT}$ for which the depletion zone produced adjacent said collector element extends to the depletion zone adjacent said emitter element, which is less than the avalanche breakdown voltage for said collector and base elements, and which is sufficiently close to said avalanche breakdown voltage to produce substantial electron avalanching in said base element.

2. The method of operating a transistor to provide improved high frequency operation, said transistor having an emitter element, a collector element and an intervening base element, said base element having a resistivity of about 0.1 ohm centimeter and a minimum thickness between said emitter and collector elements of less than about 0.1 mil, said method comprising operating said transistor with a reverse collector voltage which is greater than the punch through voltage $V_{PT}$ for which the depletion zone produced adjacent said collector element extends to the depletion zone adjacent said emitter element, which is less than the avalanche breakdown voltage for said collector and base elements, and which is sufficiently close to said avalanche breakdown voltage to produce substantial electron avalanching in said base element.

3. The method of operating a transistor to provide improved high frequency operation, said transistor having an emitter element, a collector element and an intervening base element, said base element having a resistivity of about 0.1 ohm centimeter and a minimum thickness between said emitter and collector elements of about 0.05 mil, said method comprising operating said transistor with a reverse collector voltage which is greater than the punch through voltage $V_{PT}$ for which the depletion zone produced adjacent said collector element extends to the depletion zone adjacent said emitter element, which is less than the avalanche breakdown voltage for said collector and base elements, and which is sufficiently close to said avalanche breakdown voltage to produce substantial electron avalanching in said base element.

References Cited in the file of this patent

UNITED STATES PATENTS

| | | |
|---|---|---|
| 2,497,770 | Hanson | Feb. 14, 1950 |
| 2,579,336 | Rack | Dec. 18, 1951 |
| 2,701,326 | Pfann et al. | Feb. 1, 1955 |
| 2,725,505 | Webster | Nov. 29, 1955 |
| 2,727,146 | Fromm | Dec. 13, 1955 |
| 2,742,383 | Barnes et al. | Apr. 17, 1956 |
| 2,759,133 | Mueller | Aug. 14, 1956 |
| 2,764,642 | Shockley | Sept. 25, 1956 |

(Other references on following page)

UNITED STATES PATENTS

| | | |
|---|---|---|
| 2,765,516 | Haegele | Oct. 9, 1956 |
| 2,790,034 | McAfee | Apr. 23, 1957 |

FOREIGN PATENTS

| | | |
|---|---|---|
| 1,038,658 | France | May 13, 1953 |
| 1,078,688 | France | May 12, 1954 |
| 1,080,034 | France | May 26, 1954 |

OTHER REFERENCES

Pub. I, Voltage Punch Through and Avalanche Breakdown and Their Effect on the Maximum Operating Voltage for Junction Transistors, by H. Schenkel et al., in Proceedings of the National Electronics Conference, 1954, vol. X, pages 614–615.